(12) United States Patent
Tutt et al.

(10) Patent No.: US 11,353,897 B1
(45) Date of Patent: Jun. 7, 2022

(54) TWO-STAGE PRESSURE REGULATOR

(71) Applicant: Tescom Corporation, Elk River, MN (US)

(72) Inventors: Brian Tutt, Elk River, MN (US); Guido Drissen, Lübeck (DE); Yingchun Zhang, Shanghai (CN)

(73) Assignee: Tescom Corporation, Elk River, MN (US)

( * ) Notice: Subject to any disclaimer, the term of this patent is extended or adjusted under 35 U.S.C. 154(b) by 0 days.

(21) Appl. No.: 17/167,801

(22) Filed: Feb. 4, 2021

(30) Foreign Application Priority Data

Jan. 14, 2021 (CN) .......................... 202120101365.9

(51) Int. Cl.
    *G05D 16/04* (2006.01)
    *G05D 16/10* (2006.01)

(52) U.S. Cl.
    CPC ....... *G05D 16/0402* (2019.01); *G05D 16/103* (2013.01); *Y10T 137/7795* (2015.04)

(58) Field of Classification Search
    CPC .......... G05D 16/0402; Y10T 137/7795; Y10T 137/7811; Y10T 137/7819; Y10T 137/7825; Y10T 137/7826
    See application file for complete search history.

(56) References Cited

U.S. PATENT DOCUMENTS

| | | | | |
|---|---|---|---|---|
| 2,313,149 A | * | 3/1943 | Jacobsson ............... | A62B 9/022 137/81.1 |
| 3,211,175 A | * | 10/1965 | Replogle ................ | G05D 16/10 137/493 |
| 4,450,858 A | * | 5/1984 | Acomb ............... | G05D 16/0663 137/484.8 |
| 5,411,053 A | * | 5/1995 | Markham .............. | G05D 16/10 137/505.28 |
| 5,598,869 A | * | 2/1997 | Nelson ............... | G05D 16/0402 137/505.11 |
| 5,665,894 A | * | 9/1997 | Baker ................ | G01N 33/0006 73/1.05 |
| 5,755,254 A | * | 5/1998 | Carter ................ | G05D 16/0402 137/340 |

(Continued)

OTHER PUBLICATIONS

Matheson Guide to Regulators, Matheson Gas Products, Jan. 1999, 17 pages.

(Continued)

*Primary Examiner* — Robert K Arundale
(74) *Attorney, Agent, or Firm* — Quarles & Brady LLP

(57) ABSTRACT

A regulator for hydrogen or other media can include a regulator body and an inlet into the regulator body. A first regulator stage can be downstream of the inlet and a second regulator stage can be downstream of the first regulator stage. An interstage passage can extend between the first and second regulator stages and an outlet from the regulator body can be downstream of the second regulator stage. The first regulator stage can include a first valve seat, a first valve stem, and a first sensor configured to transmit pressure force to urge the valve stem toward the valve seat. The second regulator stage can include a second valve seat, a second valve stem, and a second sensor configured to transmit pressure force to urge the second valve stem toward the second valve seat.

20 Claims, 3 Drawing Sheets

(56) References Cited

U.S. PATENT DOCUMENTS

| | | | | |
|---|---|---|---|---|
| 8,087,428 | B1* | 1/2012 | Beswick | F16K 17/085 137/505.12 |
| 2004/0168724 | A1* | 9/2004 | Ando | G05D 16/0661 137/505.39 |
| 2006/0005887 | A1* | 1/2006 | Bonta | G05D 16/107 137/613 |
| 2009/0071548 | A1* | 3/2009 | Patterson | G05D 16/103 137/497 |
| 2009/0071550 | A1* | 3/2009 | Patterson | G05D 16/103 137/523 |
| 2015/0337769 | A1* | 11/2015 | Yoshioka | F02D 19/022 137/512 |
| 2015/0361924 | A1* | 12/2015 | Kim | F02M 21/0233 137/512.3 |
| 2016/0281872 | A1* | 9/2016 | Kobayashi | G05D 16/107 |

OTHER PUBLICATIONS

Tescom Regulators—Pressure Reducing 20-1200 Series, catalog, undated, 4 pages.

* cited by examiner

TWO-STAGE PRESSURE REGULATOR

RELATED APPLICATIONS

This application claims priority to Chinese Utility Model Application No. 202120101365.9, titled Two-Stage Pressure Regulator and filed Jan. 14, 2021, the entirety of which is incorporated herein by reference.

BACKGROUND

Pressure regulators can be used to control and reduce an input pressure of a gas to a desired output pressure. In some cases, it may be useful to control the flow of a gas, such as hydrogen, for example, from a high pressure gas supply to a lower pressure sink, such as a fuel cell, for example, which may require a consistent gas pressure input.

SUMMARY

Some embodiments of the invention provide a regulator for hydrogen flow (or other media). The regulator can include a regulator body and an inlet into the regulator body. A first regulator stage within the regulator body can be downstream of the inlet and a second regulator stage within the regulator body can be downstream of the first regulator stage. An interstage passage can extend between the first and second regulator stages. An outlet from the regulator body can be downstream of the second regulator stage. The first regulator stage can include a first valve seat, a first valve stem that is configured to seat against the first valve seat, and a first sensor. The first sensor can be configured to transmit pressure force from a first sensor area to the first valve stem to urge the first valve stem toward the first valve seat and to transmit force from a first spring to the first valve stem to urge the first valve stem away from the first valve seat. The second regulator stage can include a second valve seat, a second valve stem configured to seat against the second valve seat, and a second sensor. The second sensor can be configured to transmit pressure force from a second sensor area to the second valve stem to urge the second valve stem toward the second valve seat and to transmit force from a second spring to the second valve stem to urge the second valve stem away from the second valve seat.

In some embodiments, a regulator includes a first bore that receives a first regulator stage and a second bore that receives a second regulator stage. A central axis of the first bore can be parallel to a central axis of the second bore.

In some embodiments, a regulator can include a first valve stem and a first sensor that are configured to move within a first bore in parallel with a central axis of the first bore and a second valve stem and a second sensor that are configured to move within a second bore in parallel with a central axis of the second bore.

In some embodiments, a regulator can include a first valve seat that is secured within a regulator body with a central passage through the first valve seat in alignment with a central axis of a first bore.

In some embodiments, a regulator can include a regulator body that is a single body.

In some embodiments, a regulator can include a first valve stem that is integrally formed with a first sensor.

In some embodiments, a regulator can include a first sensor disposed to a first side of a first valve seat. A first valve stem can be configured to seal with the first valve seat on the first side of the first valve seat.

In some embodiments, a regulator can provide a flow between an inlet and an outlet within a regulator body. The flow between the inlet and the outlet does not pass within a first valve stem or a first flow sensor.

In some embodiments, a regulator can include a second valve stem that is mechanically tied to a second sensor.

Some embodiments of the invention provide a regulator for hydrogen or other media. The regulator can include a regulator body and an inlet into the regulator body. A first regulator stage within the regulator body can be downstream of the inlet, and a second regulator stage within the regulator body can be downstream the first regulator stage. An interstage passageway can extend between the first and second regulator stages. An outlet from the regulator body can be downstream of the second regulator stage. The first regulator stage can include a first valve seat, a first valve stem that is configured to seat against the first valve seat, and a first sensor that is configured to transmit pressure force from a first sensor area to the first valve stem. The second regulator stage can include a second valve seat, a second valve stem that is configured to seat against the second valve seat, and a second sensor that is configured to transmit pressure force from a second sensor area to the second valve stem. The first valve stem can be configured to move in a first direction to regulate pressure through the first regulator stage and the second valve stem can be configured to move in a second direction, parallel with the first direction, to regulate pressure through the second regulator stage.

In some embodiments, a regulator can include a regulator body. The regulator body can include a first bore that receives a first regulator stage and a second bore that receives a second regulator stage. A central axis of the first bore can be parallel to a central axis of the second bore.

In some embodiments, a regulator can include a first valve stem and a first sensor that are configured to move within a first bore in parallel with a central axis of the first bore and a second valve stem and a second sensor that are configured to move within the second bore in parallel with the central axis of the second bore. A first valve seat can be secured within a regulator body with a central passage through the first valve seat in alignment with the central axis of the first bore.

In some embodiments, a regulator can include a regulator body that is a single piece body. The single piece body can be a rectangular block.

In some embodiments, a regulator can include a valve stem that is integrally formed with a first sensor.

In some embodiments, a regulator can include a first sensor that is disposed to a first side of a first valve seat. A first valve stem can be configured to seal with the first valve seat on the first side of the valve seat.

In some embodiments, a regulator can provide a flow between an inlet and an outlet within a regulator body. The flow between the inlet and the outlet does not pass within a first valve stem or a first sensor.

In some embodiments, a regulator can include a first valve stem that extends from a first sensor, across an interstage passage, to seat against a first valve seat.

In some embodiments, a regulator can include a second valve stem that is mechanically tied to a second sensor.

In some embodiments, a regulator can include a second valve stem can be secured to a sensor plug with a keyed arrangement. The sensor plug can be secured to the second sensor with a threaded fastener opposite the second sensor from the second valve stem.

In some embodiments, a regulator can include a pressure port that extends through a first valve stem and a first sensor to communicate pressure between an interstage passage and a first sensor area. An outlet pressure port can be aligned with a center of the first sensor area.

Some embodiments of the invention provide a regulator for hydrogen or other media. The regulator can include a regulator body and an inlet into the regulator body. A first regulator stage within the regulator body can be downstream of the inlet, and a second regulator stage within the regulator body can be downstream the first regulator stage. An interstage passageway can extend between the first and second regulator stages. An outlet from the regulator body can be downstream of the second regulator stage. The first regulator stage can include a first valve seat, a first valve stem that is configured to seat against the first valve seat, and a first sensor that is configured to transmit pressure force from a first sensor area to the first valve stem. The second regulator stage can include a second valve seat, a second valve stem that is configured to seat against the second valve seat, and a second sensor that is configured to transmit pressure force from a second sensor area to the second valve stem. The first valve stem can be aligned with the first valve seat and with the interstage passage so that flow between the inlet and the outlet within the regulator, via the interstage passage and the second regulator stage, does not pass through the first valve stem or the first sensor.

In some embodiments, a regulator can include a second valve stem mechanically tied to a second sensor with a keyed arrangement.

In some embodiments, a regulator can include a first valve stem that is integrally formed with a first sensor and a pressure port that extends through the first valve stem and the first sensor to communicate pressure between an interstage passage and a first sensor area.

In some embodiments, a regulator can include a regulator body. The regulator body can include a rectangular block with a first bore and a second bore that extend in parallel into a first side thereof. The first bore can receive a first regulator stage and the second bore can receive a second regulator stage.

In some embodiments, a regulator can include a rectangular block. A first bore can extend fully through the rectangular block to define an inlet.

Some embodiments of the invention provide a regulator for hydrogen or media. The regulator can include a regulator body and an inlet into the regulator body. A first regulator stage within the regulator body can be downstream of the inlet and a second regulator stage within the regulator body can be downstream of the first regulator stage. An interstage passage can extend between the first and second regulator stages. An outlet from the regulator body can be downstream of the second regulator stage. The first regulator stage can be configured to be inserted into the regulator body along a first axis during assembly and to be actuated along the first axis to regulate operational pressure at the interstage passage. The second regulator stage can be configured to be inserted into the regulator body along a second axis during assembly and to be actuated along the second axis to regulate operational pressure at the outlet. The first axis can be parallel to the second axis.

In some embodiments, a regulator can include a first valve stem that is mechanically tied to a first sensor of a first regulator stage and a second valve stem that is mechanically tied to a second sensor of the second regulator stage.

In some embodiments, a regulator can include a first valve stem that is integrally formed with a first sensor. Flow from an inlet to an interstage passage via a first regulator stage does not pass through the first valve stem or the first sensor.

Some embodiments of the invention provide a method of manufacturing a regulator for hydrogen or other media. The method can include providing a regulator body, forming a first bore into the regulator body along a first axis, forming a second bore into the regulator body along a second axis that is parallel to the first axis, and forming a third bore into the regulator body to connect the first and second bores. The method can include installing a first valve seat, a first valve stem, a first sensor, a first spring, and a first bonnet in the first bore to form a first regulator stage. The method can include installing a second valve seat, a second valve stem, a second sensor, a second spring, and a second bonnet in the second bore to form a second regulator stage that is in fluid communication with the first regulator stage via the third bore.

In some embodiments, a method of manufacturing a regulator can include forming a first bore that extends fully through a regulator body.

In some embodiments, a method of manufacturing a regulator can include forming first and second bores. Each of the first and second bores can be at least partially formed from a first side of a regulator body.

In some embodiments, a method of manufacturing a regulator can include installing a first valve stem, a first sensor, a first spring, and a first bonnet in a first bore from a first side of a regulator body.

In some embodiments, a first valve seat can be installed into a first bore from an opposite side of a regulator body than a first valve stem, a first sensor, a first spring, or a first bonnet.

In some embodiments, a method of manufacturing a regulator can include integrally forming a first valve stem with a first sensor.

In some embodiments, a method of manufacturing a regulator can include mechanically tying a second valve stem to a second sensor.

In some embodiments, a method of manufacturing a regulator can include mechanically tying a second valve stem to a second sensor.

In some embodiments, mechanically tying the second valve stem to the second sensor can include keying the second valve stem to a sensor plug with a keyed arrangement, extending the sensor plug into a bore through the second sensor, and securing the sensor plug to the second sensor with a threaded fastener opposite the second sensor from the second valve stem.

In some embodiments, a method of manufacturing a regulator can include providing a regulator body that is a rectangular block.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
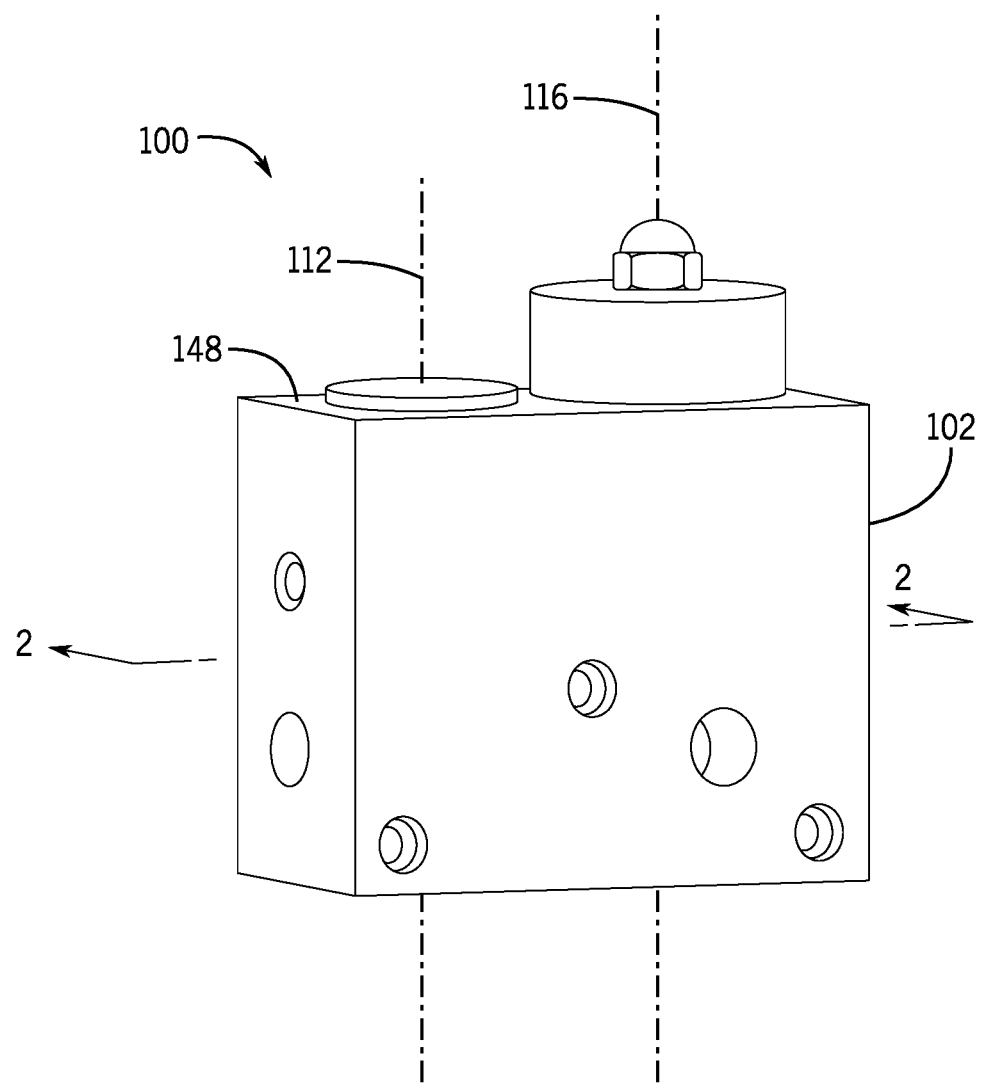
FIG. 1 is an isometric view of a regulator for hydrogen according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to regulate pressure of a fluid between a high pressure source and a sink (e.g., a receiving device), such as a fuel cell, for example. In the context of a fuel cell, hydrogen may be stored in a high pressure hydrogen tank but may need to be provided to the fuel cell at a substantially reduced pressure. In some cases, the pressure within the hydrogen tank may be around 35 MPa, whereas the inlet of a fuel cell often requires a consistent and reduced pressure, such as around 3 MPa, for example. Some conventional hydrogen regulators, which often include a single regulator stage (i.e., a sub-assembly for a specified pressure reduction), can be susceptible to leakage due to the relatively small size of hydrogen molecules.

Some embodiments of the invention can provide a two-stage pressure regulator which can reduce the pressure of hydrogen (or other gas) from a tank pressure to a consistent pressure suitable for use in a fuel cell (or other system) while reducing gas leakage relative to conventional regulators. In some embodiments, the pressure regulator described herein may be configured as an onboard pressure regulator for use with a fuel cell for a wheeled vehicle (e.g., a bus or car).

Although embodiments of the invention are presented below in the context of reducing hydrogen pressure between a tank and a fuel cell, other configurations are possible. The principles disclosed herein, for example, can be used in a variety of systems that require a fluid pressure to be reduced from a high pressure source, including for use in a device requiring a steady and relatively low pressure fluid input.

Generally, some embodiments can include a regulator having a regulator body with an inlet and an outlet. A first regulator stage within the regulator body can be downstream of the inlet, a second regulator stage within the regulator body can be downstream of the first regulator stage, and the outlet can be downstream of the second regulator stage. An intermediate passage can extend between the first regulator stage and the second regulator stage for transmission of fluid between the stages. In general, the first regulator stage is configured to receive a high pressure fluid (e.g., 35 MPa) at the inlet and reduce the pressure down to an intermediate pressure (e.g., 5 MPa) at the intermediate passage. The second regulator stage is configured to reduce the intermediate pressure down to a low pressure (e.g., 3 MPa) at the outlet.

In some embodiments, other beneficial features can be included. For example, in some embodiments, moving parts of two regulator stages can be configured to move in parallel, including so that valve stems and sensors of the respective stages travel along parallel axes to regulate the pressure of fluid moving through the regulator. As well as providing for effective operational performance, this arrangement can sometimes lead to simpler and more reliable manufacturing processes. For example, parallel movement of regulator stages may be usefully implemented via parallel installation processes, including processes in which the regulator stages are installed into parallel bores into a regulator body. In some cases, regulator stages can be primarily (e.g., entirely) installed fully from one side of a regulator body, so that substantial manufacturing processes can be performed on rectangular-block (e.g., square-block) or other regulator bodies while the regulator bodies remain in a single upright orientation (e.g., on a factory workbench).

As another example, in some embodiments, sensors and valve stems of one or more regulator stages can be mechanically tied to each other, so that forces on the sensors in multiple directions can be transmitted into corresponding forces on the valve stems. Thus, for example, leakage of fluid past valve seats that results in increased pressure within a regulator (i.e., "creep") can also result in increased sealing force being applied by one or more sensors to the corresponding one or more valve stems, with a corresponding mitigation (e.g., elimination) of further creep.

As still another example, in some embodiments, a valve stem can be configured to seal and permit fluid flow between a regulator inlet and a regulator outlet without the fluid flow passing through any passage internal to the valve stem. This arrangement, for example, can lead to an improved flow coefficient ($C_v$) for a regulator, as compared to conventional designs.

Figure 2:
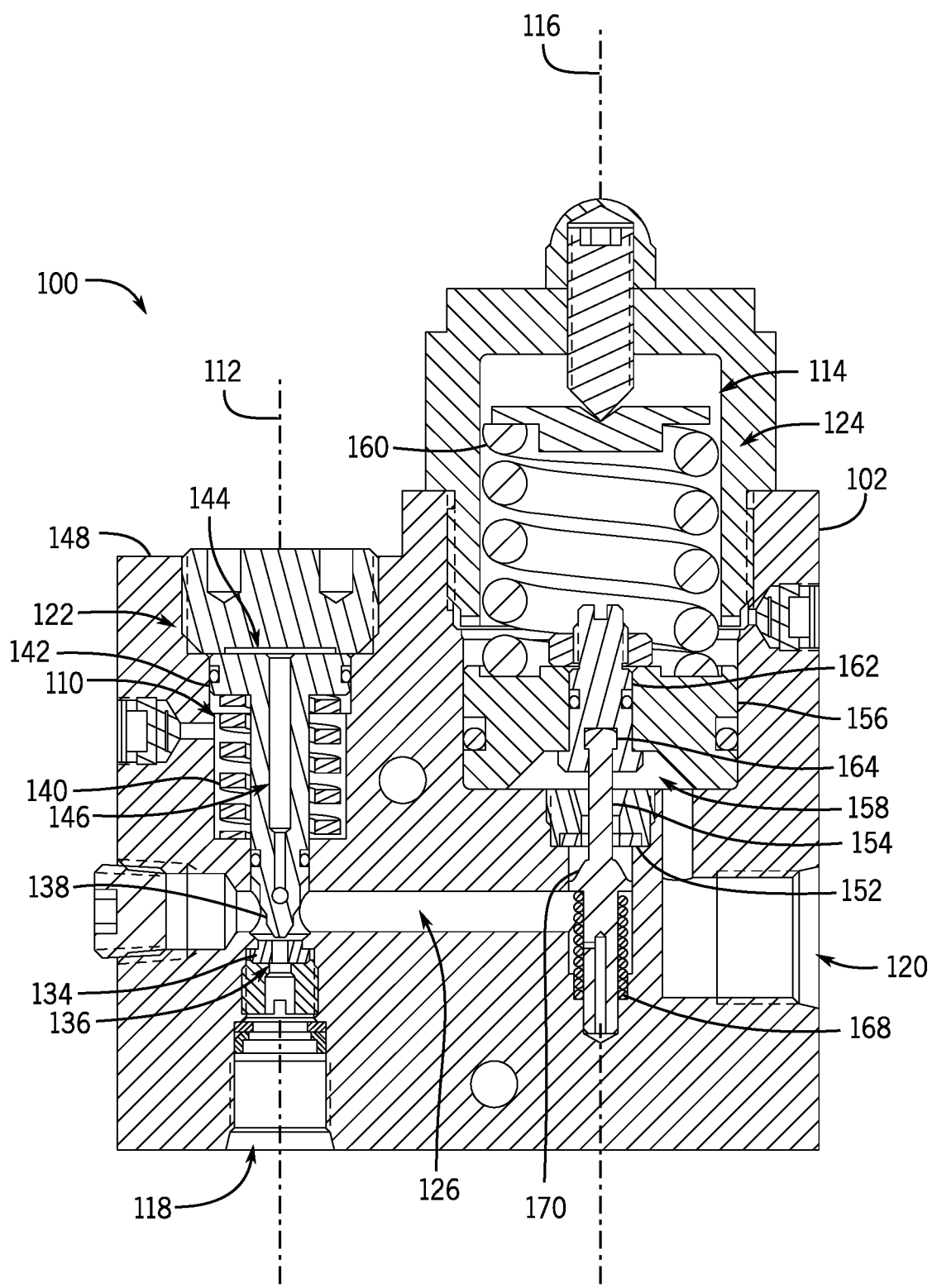
FIG. 2 is a cross-sectional side view of the regulator in an open position taken along line 2-2 of FIG. 1.
Figure 3:
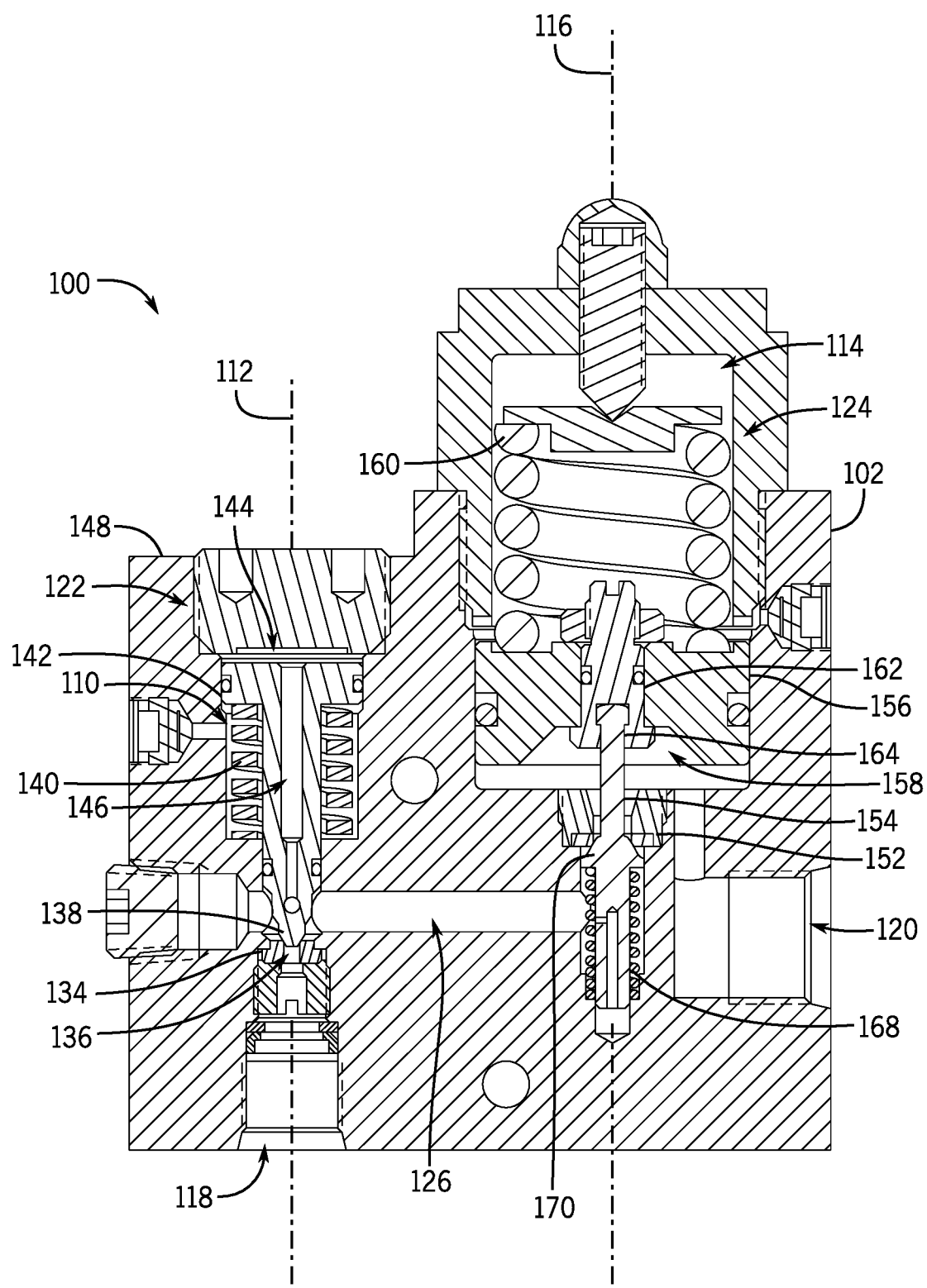
FIG. 3 is a cross-sectional side view of the regulator in a closed position taken along line 2-2 of FIG. 1.

Referring to FIGS. 1-3, one embodiment of the present invention provides a pressure regulator for reducing pressure between a hydrogen tank and a fuel cell on board a vehicle (not shown). In the embodiment illustrated, a regulator 100 includes a regulator body 102. In the illustrated example, the regulator body 102 is generally configured as a rectangular block that defines generally flat exterior surfaces. The rectangular block of the regulator body 102 can include one or more body features such as recesses, bores, and protrusions. In some embodiments, the regulator body 102 is configured as a single-piece body. Thus, for example, the regulator body 102 can be formed without requiring the use of a lathe, as further described below.

With reference to FIGS. 2 and 3, in particular, the regulator body 102 includes a first bore 110 that defines a first central axis 112, and a second bore 114 that defines a second central axis 116. The first central axis 112 and the second central axis 116 are substantially parallel (i.e., parallel to within 5° or within other commonly accepted manufacturing tolerance). The regulator 100 further includes an inlet 118, an outlet 120, a first regulator stage 122, and a second regulator stage 124. In general, the first bore 110 receives the first regulator stage 122 and the second bore 114 receives the second regulator stage 124. The first regulator stage 122 is disposed downstream of the inlet 118, and the second regulator stage 124 is disposed downstream of the first regulator stage 122. Correspondingly, the outlet 120 is disposed downstream of the second regulator stage 124. The regulator 100 further includes an interstage passage 126 that extends between the first regulator stage 122 and the second regulator stage 124.

Generally, as also discussed below, the first regulator stage 122 can impose a first regulated pressure drop on flow through the regulator 100 and the second regulator stage 124 can impose a second regulated pressure drop on flow through the regulator 100. For example, the first regulator stage 122 can be configured to reduce pressure to slightly above 3 MPa and the second regulator stage 124 can be configured to reduce pressure to 3 MPa or slightly below that value, although other pressure settings are also possible. In this regard, the use of two regulator stages can provide for improved consistency in outlet pressure during operation. For example, as the pressure of a fluid source (e.g., hydrogen tank) falls from an initial value, the pressure at the interstage passage 126 can actually increase, due to the decreasing pressure force at the inlet 118 and a constant opening force applied by a spring of the first regulator stage 122 (as also discussed below). The presence of the second regulator stage 124 can compensate for this increase in interstage pressure to ensure a suitably stable pressure at the outlet 120.

Still referring to FIGS. 2 and 3, the first regulator stage 122 includes a first valve seat 134 that is secured within the regulator body 102. In some cases, the first valve seat 134 can be formed as a rigid component, including from steel or other metals (e.g., rather than from an elastomer). The first valve seat 134 defines a central passage 136 extending therethrough, through which fluid can flow between the inlet 118 and the interstage passage 126. In particular, the central passage 136 is axially aligned with the first central axis 112 of the first bore, such as may allow for easier installation of the first valve seat 134 and improve operational performance.

The first regulator stage 122 also includes a first valve stem 138, a first spring 140, and a first sensor 142. Under some operating conditions, the first valve stem 138 is configured to seat against the first valve seat 134 and thereby form a seal with the first valve seat 134 on a first side of the first valve seat 134 (see, for example, FIG. 3). Additionally, the first valve stem 138 and the first sensor 142 are configured to move within the first bore 110 parallel to the first central axis 112. In the illustrated embodiment, the first spring 140 biases the first valve stem 138 toward an open position (see, for example, FIG. 2). As generally noted above, although this spring arrangement may be useful to ensure appropriate flow through the regulator 100, it can result in increasing interstage pressure as pressure at the inlet 118 falls, which can be mitigated by operation of the second regulator stage 124.

During a manufacturing process of the regulator 100, the first bore 110 can be formed by drilling, milling, or other machining operation. For example, the first bore 110 can be formed by machining partially through the regulator body 102 along the first central axis 112, starting from a top surface 148 of the regulator body 102. The first bore 110 can then be fully formed by machining from a bottom surface (i.e., opposite the top surface 148) along the first central axis 112. The first regulator stage 122 can then be inserted into the regulator body 102 along the first central axis 112. For example, the first valve stem 138, the first spring 140, and the first sensor 142 can be inserted into the first bore 110 from a first side of the regulator body 102 and the first valve seat 134 can be inserted into the first bore 110 from a second, opposite side of the regulator body 102. In general, in the illustrated embodiment, because the first valve stem 138 and the first sensor 142 are integrally formed (as further discussed below) and oriented fully to one side of the first valve seat 134, clearance issues between elements of the first regulator stage 122 may be minimized as compared to conventional designs.

In general, a valve sensor in the context of regulators, such as the first sensor 142, for example, is a body that forms part of a valve assembly and is configured to transmit operative force to another component of the valve assembly based on application of fluid pressure to the valve sensor by a working fluid within the valve assembly. In the illustrated example, the first sensor 142 is configured as a piston that can transmit pressure force from a first sensor area 144 to the first valve stem 138 to urge the first valve stem 138 toward the first valve seat 134. For example, if the force from the pressure sensed within the first sensor area 144 (e.g., due to permitted flow or creep at the first valve seat 134) exceeds the opposing force provided by the first spring 140, the first valve stem 138 will move toward the first valve seat 134, thereby sealing, or at least partially restricting flow at, the first valve stem 138 and the first valve seat 134. In this regard, for example, a pressure port 146 extends through the first valve stem 138 and the first sensor 142 to communicate pressure between the interstage passage 126 and the first sensor area 144.

As shown in the illustrated embodiment, the pressure port 146 is aligned with a center of the first sensor area 144 and the first central axis of the first bore 110. Accordingly, even transient pressure signals via the pressure port 146 can result in balanced application of force to the first sensor 142 within the first sensor area 144, a corresponding application of primarily axial force to the first valve stem 138 and, as a result, improved sealing at the first valve seat 134 as compared to some conventional designs.

In some embodiments a first (or other) valve stem can be mechanically tied to a first (or other) sensor, so that the sensor can transmit force to the valve stem in two opposing directions (e.g., along an axis of movement of the relevant regulator stage). In this regard, for example, the first valve stem 138 is integrally formed with the first sensor 142, as shown in FIGS. 2 and 3, although other configurations are possible. In general, the integral formation of the first valve stem 138 and the first sensor 142 can provide the benefits of a mechanically tied arrangement while also eliminating the need for a seal to be disposed between the first valve stem 138 and the first sensor 142, as may reduce the potential for leak passageways. Further, the general T-shape of the piston (i.e., the first valve stem 138 and the first sensor 142) and the alignment with the first central axis 112 can provide improved stability and prevent off-center loading at the first regulator stage 122.

As well as providing various benefits relative to force balance and sealing, the illustrated configuration of the first regulator stage 122 can provide other benefits. For example, in use, the first valve stem 138 and the first sensor 142 are configured to remain separate from the flow path of a fluid flow between the inlet 118 and the outlet 120, such that flow between the inlet 118 and the outlet 120 passes by, but not through, the first valve stem 138 and the first sensor 142. In some cases, this can lead to improved flow coefficients ($C_v$) as compared to conventional designs. Further, each of the seals (e.g., O-rings) disposed within the first regulator stage 122 and the second regulator stage 124 are downstream of the first pressure reducing orifice at the first valve seat 134. Therefore, the seals are not exposed to the relatively high pressure at the inlet 118, but instead are exposed to a pressure that is at or below an interstage pressure.

The second regulator stage 124 includes a second valve seat 152, which can also be configured as a rigid seat, and a second valve stem 154. The second valve stem 154 is configured to seat against the second valve seat 152 (see, for example, FIG. 3). The second regulator stage 124 also includes a second sensor 156, a corresponding second sensor area 158, and a second spring 160. The second valve stem 154 and the second sensor 156 are configured to move within the second bore 114 parallel to the second central axis 116 (and, correspondingly, in parallel with components of the first regulator stage 122). The second spring 160 is biased to urge the second valve stem 154 away from the second valve seat 152. The second sensor 156 is configured to transmit a pressure force from the second sensor area 158 to the second valve stem 154 to urge the second valve stem 154 toward the second valve seat 152.

As further illustrated in FIGS. 2 and 3, the second valve stem 154 is mechanically tied (i.e., coupled) to the second sensor 156. In particular, the second sensor 156 includes a sensor plug 162 with a keyed arrangement 164 to secure a free end of the second valve stem 154. The sensor plug 162 extends through a central bore of the second sensor 156 and is secured to the second sensor 156 with a threaded fastener opposite the second sensor 156 from the second valve stem 154. The illustrated configuration, including the keyed arrangement for the second valve stem 154 and the threaded arrangement for the sensor plug 162 can result in a particularly high strength tie. In other embodiments, however, other tying arrangements may be possible. For example, a valve stem may be keyed or otherwise secured directly to a valve sensor or may be otherwise secured to a plug (e.g., via a threaded arrangement).

Generally, mechanically tying the second valve stem 154 to the second sensor 156 can also help to reduce creep for the regulator 100. For example, leakage of fluid past the second valve seat 152 can result in an increase in pressure at the second sensor area 158 and a corresponding increase in force (e.g., upward force, as illustrated) on the second sensor 156. With the second sensor 156 mechanically tied to the second valve stem 154, this force on the second sensor 156 can be transmitted to an increase in closing force for the second valve stem 154 relative to the second valve seat 152, with a corresponding reduction in creep at the second valve seat 152.

In the illustrated embodiment, the second regulator stage 124 also includes a third spring 168. In general, the third spring 168 has a lower spring rate than the second spring 160. (The second spring 160 can itself have a lower spring rate than the first spring 140, to accommodate interstage pressure swings (e.g., approximately plus or minus 1 MPa) as discussed above, which helps provide a stable outlet pressure.) The third spring 168 extends along a bottom portion of the second valve stem 154 which extends into a bottom portion of the second bore 114. The bottom portion of the second bore 114 provides a space for the second valve stem 154 to move along the second central axis 116, with a pressure port through the second valve stem 154 ensuring appropriate pressure balancing relative to the noted space. The third spring 168 is configured to engage a stopper 170 of the second valve stem 154 and provide a supplemental closing force against the second valve seat 152. Although not shown in FIGS. 2 and 3, it will be recognized that the stopper 170 can provide various openings (e.g., squared sides that provide clearance relative to the side walls of the second bore 114) through which fluid can flow to move past the stopper 170 and into the second sensor area 158.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system. In this regard, for example, some embodiments include manufacturing methods to produce the regulator 100, including according to operations expressly or implicitly disclosed above in the Detailed Description or the Summary.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A regulator for hydrogen flow comprising:
   a regulator body;
   an inlet into the regulator body;
   a first regulator stage within the regulator body, downstream of the inlet;
   a second regulator stage within the regulator body, downstream of the first regulator stage;
   an interstage passage extending between the first and second regulator stages; and
   an outlet from the regulator body, downstream of the second regulator stage;
   the first regulator stage comprising:
      a first valve seat;
      a first valve stem configured to seat against the first valve seat; and a first sensor integrally formed with the first valve stem and configured to transmit pressure force from a first sensor area to the first valve stem;

the second regulator stage comprising:
  a second valve seat;
  a second valve stem configured to seat against the second valve seat; and
  a second sensor configured to transmit pressure force from a second sensor area to the second valve stem;
  wherein the first valve stem is configured to move in a first direction to regulate pressure through the first regulator stage and the second valve stem is configured to move in a second direction, parallel with the first direction, to regulate pressure through the second regulator stage.

2. The regulator of claim 1, wherein the regulator body includes a first bore that receives the first regulator stage and a second bore that receives the second regulator stage; and
  wherein a central axis of the first bore is parallel to a central axis of the second bore.

3. The regulator of claim 2, wherein the first valve stem and the first sensor are configured to move within the first bore in parallel with the central axis of the first bore;
  wherein the second valve stem and the second sensor are configured to move within the second bore in parallel with the central axis of the second bore; and
  wherein the first valve seat is secured within the regulator body so that a central passage through the first valve seat is in alignment with the central axis of the first bore.

4. The regulator of claim 2, wherein the regulator body is a single piece body.

5. The regulator of claim 4, wherein the regulator body is a rectangular block.

6. The regulator of claim 1, wherein first sensor is disposed to a first side of the first valve seat; and
  wherein the first valve stem is configured to seal with the first valve seat on the first side of the first valve seat.

7. The regulator of claim 1, wherein flow between the inlet and the outlet within the regulator body does not pass within the first valve stem or the first sensor.

8. The regulator of claim 7, wherein the first valve stem extends from the first sensor, across the interstage passage, to seat against the first valve seat.

9. The regulator of claim 1, wherein the second valve stem is mechanically tied to the second sensor.

10. The regulator of claim 9, wherein one or more of:
  the second valve stem is secured to a sensor plug with a keyed arrangement; or
  the sensor plug is secured to the second sensor with a threaded fastener opposite the second sensor from the second valve seat.

11. The regulator of claim 1, wherein a pressure port extends through the first valve stem and the first sensor to communicate pressure between the interstage passage and the first sensor area; and
  wherein an outlet of the pressure port is aligned with a center of the first sensor area.

12. The regulator of claim 1, further comprising:
  a sensor plug that extends through a central bore of the second sensor;
  wherein the second valve stem is secured to the second sensor via a keyed arrangement with the sensor plug.

13. A regulator comprising: a regulator body including a rectangular block with a first bore and a second bore that extend in parallel into a first side of the regulator body; an inlet into the regulator body; a first regulator stage received within the first bore of the regulator body, downstream of the inlet; a second regulator stage received within the second bore of the regulator body, downstream of the first regulator stage; an interstage passage extending between the first and second regulator stages; and an outlet from the regulator body, downstream of the second regulator stage; the first regulator stage comprising: a first valve seat; a first valve stem configured to seat against the first valve seat; a first sensor configured to transmit pressure force from a first sensor area to the first valve stem; and a first spring configured to bias the first sensor away from the first valve seat when the first valve stem is in an open position; the second regulator stage comprising: a second valve seat; a second valve stem configured to seat against the second valve seat; and a second sensor configured to transmit pressure force from a second sensor area to the second valve stem; wherein, the first valve stem is aligned with the first valve seat and with the interstage passage so that flow between the inlet and the outlet within the regulator body, via the interstage passage and the second regulator stage, does not pass through the first valve stem or the first sensor.

14. The regulator of claim 13, wherein the second valve stem is mechanically tied to the second sensor with a keyed arrangement.

15. The regulator of claim 13, wherein the first valve stem is integrally formed with the first sensor; and
  wherein a pressure port extends through the first valve stem and the first sensor to communicate pressure between the interstage passage and the first sensor area.

16. The regulator of claim 13, wherein the first bore extends fully through the rectangular block to define the inlet.

17. The regulator of claim 13, further comprising:
  a second spring configured to bias the second sensor toward the second valve seat; and
  a third spring that extends along the second valve stem opposite the second valve seat from the second spring and is configured to provide a supplemental closing force to the second valve stem, in opposition to the second spring.

18. A regulator comprising:
  a regulator body;
  an inlet into the regulator body;
  a first regulator stage within the regulator body, downstream of the inlet, the first regulator stage comprising:
    a first valve seat;
    a first valve stem configured to seat against the first valve seat; and
    a first sensor integrally formed with the first valve stem to be mechanically tied to the first valve stem to transmit pressure force from a first sensor area to the first valve stem;
  a second regulator stage within the regulator body, downstream of the first regulator stage;
  an interstage passage extending between the first and second regulator stages; and
  an outlet from the regulator body, downstream of the second regulator stage;
  wherein the first regulator stage is configured to be inserted into the regulator body along a first axis during assembly and to be actuated along the first axis to regulate operational pressure at the interstage passage;
  wherein the second regulator stage is configured to be inserted into the regulator body along a second axis during assembly and to be actuated along the second axis to regulate operational pressure at the outlet;
  wherein the first axis is parallel to the second axis; and wherein the interstage passage extends perpendicularly to the first and second axes.

19. The regulator of claim 18, wherein a second valve stem is mechanically tied to a second sensor of the second regulator stage.

20. The regulator of claim 18,
wherein flow from the inlet to the interstage passage via the first regulator stage does not pass through the first valve stem or the first sensor.

* * * * *